United States Patent [19]

Jozefczak

[11] Patent Number: 5,022,113
[45] Date of Patent: Jun. 11, 1991

[54] COMPACT SIDE MOUNTED WIPER

[75] Inventor: Thadius F. Jozefczak, Warren, Mich.

[73] Assignee: General Motors Corporation, Detroit, Mich.

[21] Appl. No.: 494,294

[22] Filed: Mar. 16, 1990

[51] Int. Cl.$^5$ ................................................ B60S 1/04
[52] U.S. Cl. ................................. 15/250.42; 15/250.32
[58] Field of Search ............ 15/250.42, 250.31, 250.32, 15/250.35, 250.36, 250.41, 250.20

[56] References Cited

U.S. PATENT DOCUMENTS

| 3,158,890 | 12/1964 | Anderson | 15/250.42 |
| 3,605,168 | 9/1971 | Moorhead et al. | 15/250.42 |
| 3,942,212 | 3/1976 | Steger et al. | 15/250.42 |
| 3,978,543 | 9/1976 | Tomlin | 15/250.42 |
| 4,102,003 | 7/1978 | Hancu | 15/250.42 |
| 4,318,200 | 3/1982 | Bauer et al. | 15/250.32 |
| 4,793,020 | 12/1988 | Stratton et al. | 15/250.42 |

Primary Examiner—Harvey C. Hornsby
Assistant Examiner—G. Graham
Attorney, Agent, or Firm—Patrick M. Griffin

[57] ABSTRACT

A side mounted wiper uses independently pivoted pairs of longer and shorter support beams that are specially designed to operate within shared horizontal and vertical space, thus providing even blade support and pressure distribution within a compact height and area.

2 Claims, 2 Drawing Sheets

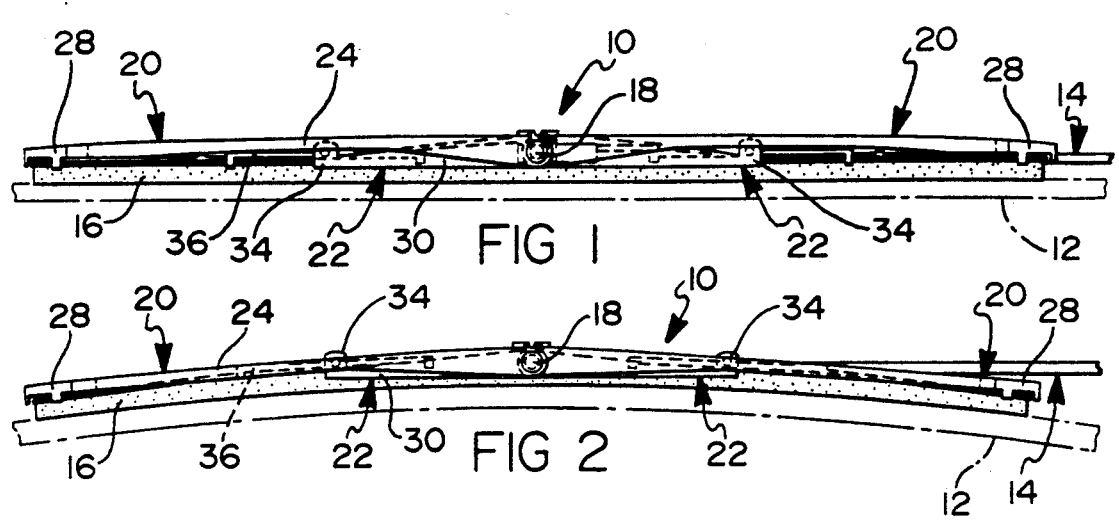
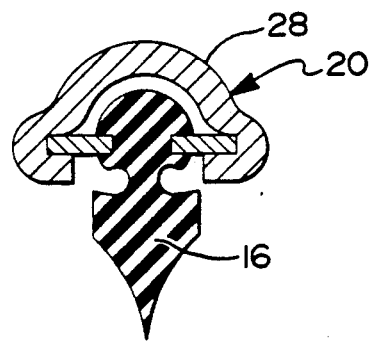
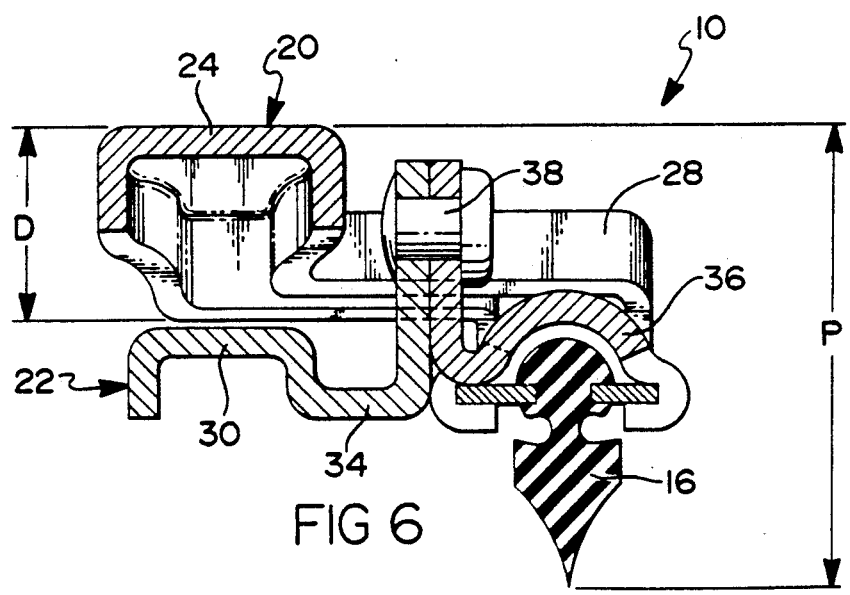

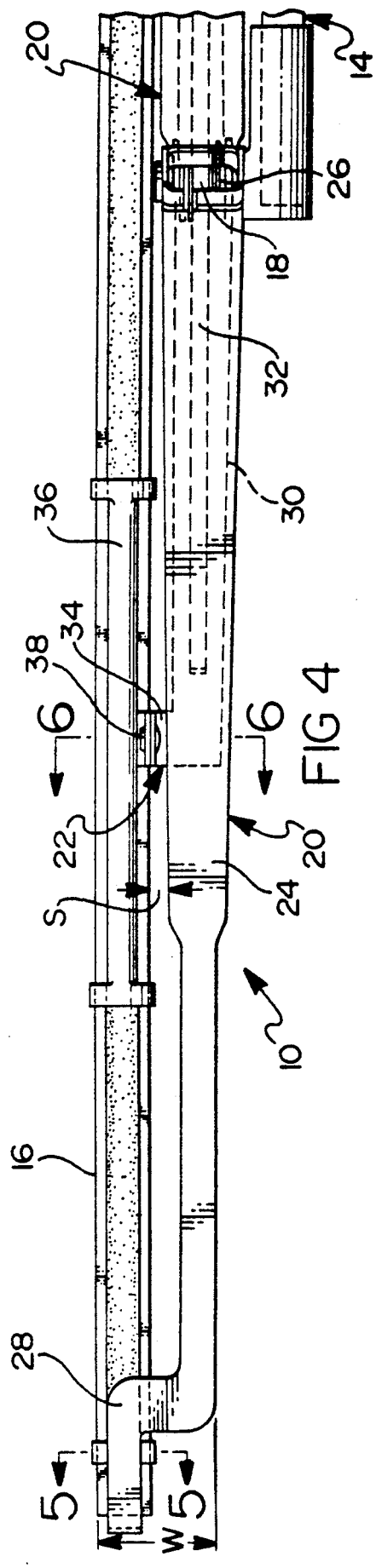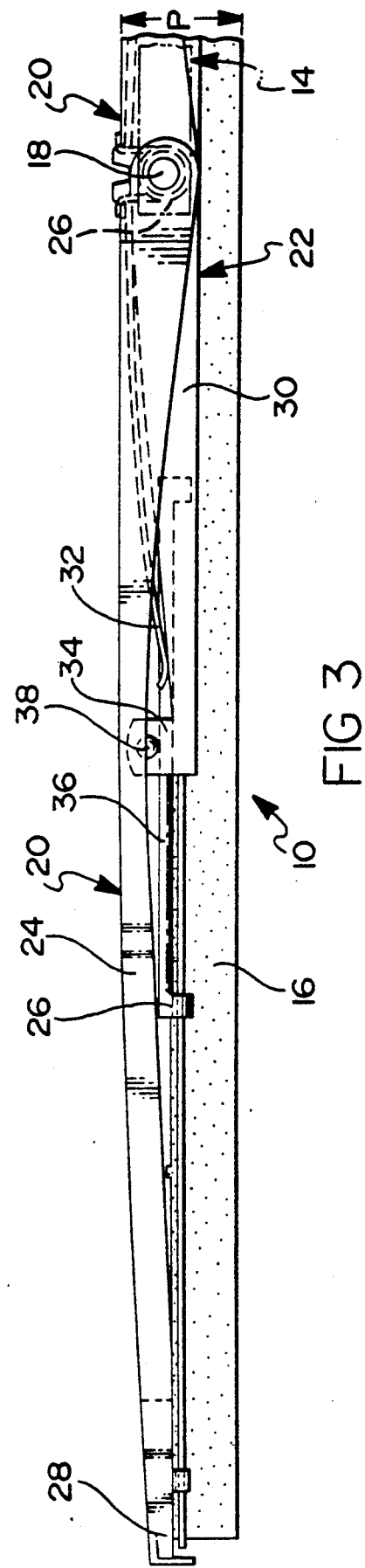

COMPACT SIDE MOUNTED WIPER

This invention relates to vehicle wipers in general, and specifically to a side mounted arm and blade assembly of particularly compact and low profile construction.

BACKGROUND OF THE INVENTION

Vehicle wipers have a wiper arm that is swept back and forth over the windshield, carrying the wiper blade with it. A tension spring biases the arm and blade down continually, toward the windshield, so as to maintain a constant wiping pressure. Some mechanism is necessary to physically mount the blade to the arm, preferably in such a way that the blade can be removed and replaced. Ideally, the same mechanism would also evenly distribute the arm pressure to the blade while allowing the blade to conform to the curve of the windshield. Most production wipers today use a blade mount that consists of a series of interpivoted yokes, which support the blade at a number of locations evenly spaced along its length. This distributes pressure evenly, but still allows the blade to conform.

If the blade is mounted beneath the arm with such a mechanism, a good deal of vertical space is required, giving the wiper a large height or profile. This may be objectionable from a styling standpoint, or because of air drag. An alternative is to mount the blade to the side of the arm, with a similar mechanism. Side mounted blades offer a significantly lower height profile above the windshield, but obviously occupy more side to side or lateral area over the windshield. This, too, may be objectionable from a styling standpoint.

SUMMARY OF THE INVENTION

The invention provides a side mounted wiper that is very compact in the lateral sense, but which still has a low height profile. In the embodiment disclosed, the wiper arm is the type that has a pivot pin extending to one side, providing a pivot axis. A pair of primary beams, each of which is approximately half the length of the wiper blade, have their inner ends pivoted to the pin. Each primary beam has a main body that is straight and channel shaped in cross section. The end of each primary beam is not straight, but is bent out laterally to provide a blade mounting hook. The hooks are aligned, and so are capable of supporting the wiper blade parallel to the sides of the primary beams and compactly, with only a small side gap. The primary beams alone are not sufficient to support the blade, however.

Additional blade support is provided by a pair of secondary beams, pivoted independently at their inner ends to the same pin. The secondary beams, which are about half as long as the primary, are also channel shaped, with a straight main body. These are sized so as to nest within the main body of the primary beams, coextensive and occupying much of the same vertical space. Each secondary beam also has a blade mounting flange at the end that extends out to the side, into and within the existing side gap. The secondary beam flanges provide extra, intermediate support to the blade, but do not take up any extra lateral area or space. The way in which the beams are nested together allows them to pivot independently, so that the wiper blade can conform to the windshield efficiently, but still maintains a low profile above the windshield.

It is, therefore, a general object of the invention to provide an improved side mount wiper that is particularly compact and low in profile.

It is another object of the invention to provide such a wiper in which the mechanism that mounts the wiper blade to the arm has a pair of longer primary beams with offset, aligned blade mounting hooks at the ends, and a pair of shorter secondary beams coextensive with the longer beams that have offset, aligned blade mounting flanges at the ends, so that the pairs of beams cooperate to support the wiper blade at multiple points in close, parallel relation.

It is another object of the invention to provide such a blade mounting mechanism in which the secondary beams are nested within the primary beams in such a way as to provide a low profile.

DESCRIPTION OF THE PREFERRED EMBODIMENT

These and other objects and features of the invention will appear from the following written description, and from the drawings, in which:

FIG. 1 is a side view of a preferred embodiment of the blade of the invention, engaged with a flat portion of the windshield;

FIG. 2 is a view like 1, but at a curved portion of the windshield;

FIG. 3 is an enlarged side view of approximately half of the wiper of the invention;

FIG. 4 is a plan view of the same part of the wiper;

FIG. 5 is a sectional view taken along the line 5—5 of FIG. 4;

FIG. 6 is a sectional view taken along the line 6—6 of FIG. 4.

Referring first to FIGS. 1 and 2, a preferred embodiment of the wiper of the invention is indicated generally at 10. A vehicle windshield, indicated schematically at 12, is basically planar. However, it may be flat in places, as shown in FIG. 1, and curved in others, FIG. 2. A wiper arm, indicated generally at 14, is oscillated in a desired wipe pattern back and forth over windshield 12 by a conventional motor and linkage, not illustrated. Wiper arm 14 would also be continually tensioned toward the windshield by a standard tension spring, not shown. A conventional wiper blade 16 has a predetermined end-to-end length, and a constant thickness or height. Blade 16 is flexible enough to conform to the curve of windshield 12, but the mounting mechanism that holds it to wiper arm 14 must support it in such a way its flexibility can operate. In addition, the mounting mechanism should serve to distribute the wiping pressure tension provided by arm 14 evenly, while occupying as little space as possible.

Referring next FIGS. 3 through 6, wiper arm 14 is basically straight along its entire length, except for a pivot pin 18 molded to the end and extending at a right angle to the side. Pivot pin 18 provides a side pivot axis parallel to the windshield 12, to which blade 16 is to be mounted. The blade mounting mechanism of the invention comprises two pairs of beams, a pair of primary beams, indicated generally at 20, and secondary beams, indicated generally at 22. Each primary beam 20 is a steel stamping about half as long as blade 16, with a main body 24 that is channel shaped, creating a U-shaped cross section, best shown in FIG. 6. The main body 24 is straight, as seen in FIG. 4, and basically flat, but with a gentle convex curve moving end-to-end, best seen in FIG. 3. The inner ends of primary beams 20 are pivoted to pin 18, extending out in opposite directions therefrom like wings. The primary beams 20 are given a continual downward rotational bias about pin 18 by a torsion spring 26. At the outer end, each primary beam 20 is offset, bent out laterally about 90 degrees and then back so as to create an integral blade mounting hook 28. The hooks 28 are coplanar and aligned, and can therefore support the ends of wiper blade 16 closely parallel to the side of the primary beams 20. This occupies a lateral area with a width W that includes only a small side gap S. Furthermore, as best seen in FIG. 6, the total height or profile P above the windshield 12 is not a great deal more than the height of blade 16 itself. The extra height D is due mainly to the curvature of the primary beams 20, plus the thickness imposed by their channel shape.

Still referring to FIGS. 3 through 6, it may be seen how the particular shape and orientation the primary beams 20 are used to accommodate and cooperate with the secondary beams 22. The primary beams 20 alone would not be enough to support blade 16 and adequately distribute the wiping pressure of arm 14. The secondary beams 22 are also channel shaped steel stampings, about half as long as the primary beams 20. They, too, have a straight main body 30, which is basically flat, but with a slight downward curvature moving from the inner end. The U-shaped cross section of the secondary beam main body 30 is sized so as to nest closely within the inner ends of the primary beam main bodies 24. Thus, each secondary beam 22 can be pivoted at its inner end to the same pin 18, and so move independently about the same axis. A curved leaf spring 32 installed in the vertical space between the nested primary and secondary beam pairs 20 and 22 bears down on the top of each secondary beam 22 to also give them a continual downward rotational bias about pin 18. Because of the way they are nested together, the primary secondary beam pairs 20 and 22 are coextensive and coextensive over most of their length, sharing much of the same lateral and vertical space. Each secondary beam 22 is also offset, bent out ninety degrees at its outer end to create a generally L-shaped blade mounting flange 34, which rests in the gap S. Each flange 34, in turn, mounts a yoke 36 on a secondary pivot 38, aligned with the hooks 28, which provide extra support to wiper blade 16 intermediate its ends and the pin 18.

Referring again to FIGS. 1 and 2, the relative size and orientation of the paired and nested beams 20 and 22 allows blade 16 to efficiently conform to the windshield 12. The downward wiping pressure of arm 14 is distributed along blade 16 evenly by the aligned and evenly spaced hooks 28 and yokes 36, aided by the springs 28 and 32. When a curved part of windshield 12 is encountered, the beams 20 and 22 can pivot independently about pin 18, while the yokes 36 pivot independently on secondary pivot 38, allowing blade 16 to take on the necessary shape. The upward curvature of each primary beam main body 24 provides sufficient clearance for a respective flange 34, as does the side gap S, enough so that the beams 20 and 22 can pivot up and down without interference. All the components stay within a laterally compact area, defined by the length of wiper blade 16 and the width W. Thus, the extra height D is used to advantage to provide room for the secondary beams 22. The components also remain basically within the compact profile P, even at the most extreme curvatures, although the tops of the flanges 34 move slightly above the tops of the primary beams 20, see FIG. 2.

Variations of the preferred embodiment could be made. If it were desired not to nest the secondary beams 22 directly within the primary beams 20, they could still be run coextensive with and beneath them, by adding more downward curvature to the secondary beams 22 and more upward curvature to the primary beams 20. This would still maintain the compact lateral width W, but would increase the height profile P. The hooks 28 could be separate components attached to the primary beams 20, like the yokes 36 riveted to the flanges 34, rather than integral. This would simplify the stamping shape. Therefore, it will be understood that it is not intended to limit the invention to just the embodiment disclosed.

The embodiments of the invention in which an exclusive property or privilege is claimed are defined as follows.

1. In a vehicle wiper system having a wiper arm with a side pivot axis and a generally straight wiper blade with a predetermined end to end length, a compact blade to arm mounting assembly, comprising, a pair of generally straight primary beams, each approximately half the length of said blade and pivoted to said wiper arm axis, each primary beam further having a straight main body and a blade mounting hook that is laterally offset from its main body and aligned with the hook of the other primary beam so as to support said wiper blade near the blade ends in proximate parallel relation to the side of said primary beams with a small side gap therebtween, and, a pair of generally straight secondary beams, each approximately half the length of said primary beams and pivoted independently to said wiper arm axis, each secondary beam further having a straight main body oriented coextensive to a respective primary beam main body and a blade mounting flange that is laterally offset from its main body and located in said side gap, so as to provide intermediate support to said wiper blade within a laterally compact area.

2. In a vehicle wiper system having a wiper arm with a side pivot axis and a generally straight wiper blade with a predetermined end to end length, a compact blade to arm mounting assembly, comprising, a pair of generally straight primary beams, each approximately half the length of said blade and pivoted to said wiper arm axis, each primary beam further having a straight, channel shaped main body and a blade mounting hook that is laterally offset from its main body and aligned with the hook of the other primary beam so as to support said wiper blade near the blade ends in proximate parallel relation to the side of said primary beams with a small side gap therebtween, and, a pair of generally straight secondary beams, each approximately half the length of said primary beams and pivoted independently to said wiper arm axis, each secondary beam further having a straight main body oriented coextensive to and nested within a respective primary beam main body and a blade mounting flange that is laterally offset from its main body and located in said side gap, so as to provide intermediate support to said wiper blade within a laterally compact area and compact height.

* * * * *